(12) United States Patent
Zhou et al.

(10) Patent No.: US 9,819,900 B2
(45) Date of Patent: Nov. 14, 2017

(54) METHOD AND APPARATUS FOR DE-INTERLACING TELEVISION SIGNAL

(71) Applicant: Spreadtrum Communications (Shanghai) Co., Ltd., Zhangjiang, Shanghai (CN)

(72) Inventors: Hong Zhou, Shanghai (CN); Hu Wei, Shanghai (CN); Xiaowei Luo, Shanghai (CN); Sen Wang, Shanghai (CN); Minjie Chen, Shanghai (CN); Jun Zhu, Shanghai (CN); Duan Xue, Shanghai (CN); Fuhuei Lin, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/234,356

(22) Filed: Aug. 11, 2016

(65) Prior Publication Data
US 2017/0195621 A1     Jul. 6, 2017

(30) Foreign Application Priority Data
Dec. 30, 2015   (CN) .......................... 2015 1 1025765

(51) Int. Cl.
*H04N 7/01*      (2006.01)
*H04N 11/20*     (2006.01)

(52) U.S. Cl.
CPC ................................ *H04N 7/0137* (2013.01)

(58) Field of Classification Search
USPC ....... 348/441, 446, 451, 452, 456, 469, 478, 348/479, 538, 308, 199, 116, 25, 448, 348/458, 706, 719, 725; 345/3.3, 55, 345/100, 475, 520, 560, 571, 606, 650, 345/674; 375/240.16, 240.11, 240.21, 375/240.26; 382/300, 284
See application file for complete search history.

(56) References Cited

U.S. PATENT DOCUMENTS

| 2004/0263685 | A1* | 12/2004 | Song | H04N 7/012 348/452 |
| 2006/0023119 | A1* | 2/2006 | Han | H04N 7/012 348/452 |
| 2006/0176393 | A1* | 8/2006 | Fazzini | H04N 7/012 348/448 |

(Continued)

*Primary Examiner* — Jefferey F Harold
*Assistant Examiner* — Mustafizur Rahman
(74) *Attorney, Agent, or Firm* — Cantor Colburn LLP

(57) ABSTRACT

Method and apparatus for de-interlacing a television signal are provided. The method includes: determining whether a pixel to be interpolated is in a strictly static mode; if it is in the strictly static mode, obtaining a pixel value of a first pixel in a previous field which corresponds to the pixel to be interpolated, and setting a pixel value of the pixel to be interpolated to be equal to the pixel value of the first pixel; if it is not in the strictly static mode, determining gradient bands along a plurality of directions by taking the pixel to be interpolated as a center, determining a direction of the pixel to be interpolated based on the gradient bands, and setting the pixel value of the pixel to be interpolated by interpolation based on the direction. Accuracy of the pixel value of the pixel to be interpolated may be improved.

14 Claims, 5 Drawing Sheets

(56) References Cited

U.S. PATENT DOCUMENTS

| | | | |
|---|---|---|---|
| 2007/0103586 A1* | 5/2007 | MacInnis | H04N 5/144 348/448 |
| 2007/0247547 A1* | 10/2007 | Liu | G06T 3/4007 348/458 |
| 2008/0055465 A1* | 3/2008 | Chang | H04N 7/012 348/448 |
| 2008/0122975 A1* | 5/2008 | Winger | H04N 7/012 348/448 |
| 2008/0211960 A1* | 9/2008 | Wang | H04N 7/012 348/448 |
| 2009/0147133 A1* | 6/2009 | Wei | H04N 7/012 348/452 |
| 2010/0238355 A1* | 9/2010 | Blume | G06T 7/246 348/607 |
| 2010/0322536 A1* | 12/2010 | Tezuka | G06T 3/00 382/300 |
| 2012/0017977 A1* | 1/2012 | Satou | C23C 18/1266 136/255 |
| 2012/0170657 A1* | 7/2012 | Wang | H04N 7/014 375/240.16 |
| 2012/0182452 A1* | 7/2012 | Yasuma | H04N 1/4097 348/246 |
| 2013/0051665 A1* | 2/2013 | Shinozaki | G06T 5/00 382/167 |
| 2013/0069975 A1* | 3/2013 | Bernard | G06T 11/00 345/606 |
| 2013/0201404 A1* | 8/2013 | Lu | H04N 5/142 348/699 |
| 2013/0287315 A1* | 10/2013 | Oo | H04N 5/144 382/284 |
| 2014/0085536 A1* | 3/2014 | Wang | A61F 2/4684 348/452 |

* cited by examiner

METHOD AND APPARATUS FOR DE-INTERLACING TELEVISION SIGNAL

CROSS-REFERENCE TO RELATED APPLICATIONS

The present application claims priority to Chinese patent application No. 201511025765.1, filed on Dec. 30, 2015, and entitled "METHOD AND APPARATUS FOR DE-INTERLACING TELEVISION SIGNAL", and the entire disclosure of which is incorporated herein by reference.

FIELD OF THE DISCLOSURE

The present disclosure generally relates to signal processing technology field, and more particularly, to a method and apparatus for de-interlacing a television signal.

BACKGROUND OF THE DISCLOSURE

In transmission and reception of television signals, interlaced scan is generally employed. This technique uses two fields to create a frame. One field called top field contains all odd-numbered lines in a television image; the other called bottom field contains all even-numbered lines in the television image. After the interlaced scan to the top field and the bottom field, scan data corresponding to the top field and scan data corresponding to the bottom data are combined to constitute a frame. In such way, video stream is formed. However, the formed video stream can exhibit interlacing effects. Therefore, de-interlacing of television signals is required in television signal processing.

In existing techniques, directions of missing pixels are deduced based on known pixels, and pixel values of the missing pixels are obtained by performing interpolation to the known pixels at the deduced directions.

However, the existing techniques may have following disadvantages.

(1) When hardware sources are limited, for example, there are only two lines of data in a vertical direction (that is, only one row of pixels in a top filed have known pixel values and only one row of pixels in a bottom field have known pixel values, respectively), almost no algorithm can ensure accuracy of direction determination. Further, to some details, although related data are many enough, interpolation can not be well performed based on direction determination. That is because the details do not have a clear direction (such as some corners in characters). In fact, a portion of images in a video may retain absolutely static or relatively static (global motion).

(2) Direction determination in a motion scenario is great difficulty in de-interlacing algorithm, especially when a direction of images presents a relatively small angle.

SUMMARY

In embodiments of the present disclosure, a method and apparatus for de-interlacing a television signal are provided. By employing the method or apparatus, pixel values of pixels to be interpolated may be more accurate.

In an embodiment of the present disclosure, a method for de-interlacing a television signal is provided, including: determining whether a pixel to be interpolated is in a strictly static mode; if it is determined that the pixel to be interpolated is in the strictly static mode, obtaining a pixel value of a first pixel in a previous field which corresponds to the pixel to be interpolated, and setting a pixel value of the pixel to be interpolated to be equal to the pixel value of the first pixel in the previous field; and if it is determined that the pixel to be interpolated is not in the strictly static mode, determining gradient bands along a plurality of directions by taking the pixel to be interpolated as a center, determining a direction of the pixel to be interpolated based on the gradient bands, and setting the pixel value of the pixel to be interpolated by interpolation based on the direction.

Optionally, determining whether the pixel to be interpolated is in the strictly static mode may include: selecting a first window by taking the pixel to be interpolated as a center, where the first window includes at least two rows of pixels having known pixel values, calculating pixel value differences between each pixel in the at least two rows and a corresponding pixel in a previous frame, summing absolute values of the differences for each of the at least two rows to obtain sums in each row, determining whether the sum in each row is smaller than a predetermined threshold set for each row; and selecting a second window by taking a second pixel as a center, where the second window includes at least one row of pixels having known pixel values, calculating pixel value differences between each pixel in the at least one row and a corresponding pixel in the previous frame, summing absolute values of the differences for each of the at least one row to obtain sums in each row, and determining whether the sum in each row is smaller than a predetermined threshold set for each row, where the first and the second windows are located in one frame, the second pixel is located in a second field adjacent to a first field where the first window is located, and a position of the second pixel in the second field corresponds to a position of the pixel to be interpolated in the first field.

Optionally, determining whether the pixel to be interpolated is in the strictly static mode may further include: selecting a third window by taking the pixel to be interpolated as a center, where the third window includes at least two rows of pixels having known pixel values, calculating pixel value differences between each pixel in the at least two rows and a corresponding pixel in the previous frame, summing absolute values of the differences for each of the at least two rows to obtain sums in each row, determining whether the sum in each row is smaller than a predetermined threshold set for each row, where the number of rows included in the third window is equal to the number of rows included in the first window, and the number of columns included in the third window is greater than the number of columns included in the first window; and selecting a fourth window by taking the second pixel as a center, where the fourth window includes at least one row of pixels having known pixel values, calculating pixel value differences between each pixel in the at least one row and a corresponding pixel in the previous frame, summing absolute values of the differences for each of the at least one row to obtain sums in each row, and determining whether the sum in each row is smaller than a predetermined threshold set for each row.

Optionally, determining gradient bands along the plurality of directions may include determining gradient bands along three directions.

Optionally, determining the direction of the pixel to be interpolated based on the gradient bands may include: comparing normalized first-order differential values of gradient bands on each direction; determining a direction having a smallest normalized first-order differential value as a first direction, and a direction having a second smallest normalized first-order differential value as a second direction; and if an absolute value of a first difference between the normalized first-order differential value of gradient band on the first direction and the normalized first-order differential value of gradient band on the second direction is greater than a predetermined value, determining the first direction as the direction of the pixel to be interpolated.

Optionally, determining the direction of the pixel to be interpolated based on the gradient bands may further include: if the absolute value of the first difference between the normalized first-order differential value of gradient band on the first direction and the normalized first-order differential value of gradient band on the second direction is smaller than the predetermined value, determining a third direction symmetric with the first direction and a fourth direction symmetric with the second direction; determining an absolute value of a second difference between the normalized first-order differential value of gradient band on the first direction and a normalized first-order differential value of gradient band on the third direction, and an absolute value of a third difference between the normalized first-order differential value of gradient band on the second direction and a normalized first-order differential value of gradient band on the fourth direction; if the absolute value of the second difference is greater than the absolute value of the third difference, determining the first direction as the direction of the pixel to be interpolated; and if the absolute value of the second difference is smaller than or equal to the absolute value of the third difference, determining the second direction as the direction of the pixel to be interpolated.

Optionally, the method may further include: before the direction of the pixel to be interpolated is determined based on the gradient bands, performing downsampling to the gradient bands along the plurality of directions to obtain simplified gradient bands along the plurality of directions.

In an embodiment of the present disclosure, an apparatus for de-interlacing a television signal is provided, including: a determination module, configured to determine whether a pixel to be interpolated is in a strictly static mode; a first processing module, configured to: if it is determined that the pixel to be interpolated is in the strictly static mode, obtain a pixel value of a first pixel in a previous field which corresponds to the pixel to be interpolated, and set a pixel value of the pixel to be interpolated to be equal to the pixel value of the first pixel in the previous field; and a second processing module, configured to: if it is determined that the pixel to be interpolated is not in the strictly static mode, determine gradient bands along a plurality of directions by taking the pixel to be interpolated as a center, determine a direction of the pixel to be interpolated based on the gradient bands, and set the pixel value of the pixel to be interpolated by interpolation based on the direction.

Optionally, the determination module may include a first determination unit, configured to: select a first window by taking the pixel to be interpolated as a center, where the first window includes at least two rows of pixels having known pixel values, calculate pixel value differences between each pixel in the at least two rows and a corresponding pixel in a previous frame, sum absolute values of the differences for each of the at least two rows to obtain sums in each row, determine whether the sum in each row is smaller than a predetermined threshold set for each row; and select a second window by taking a second pixel as a center, where the second window includes at least one row of pixels having known pixel values, calculate pixel value differences between each pixel in the at least one row and a corresponding pixel in the previous frame, sum absolute values of the differences for each of the at least one row to obtain sums in each row, and determine whether the sum in each row is smaller than a predetermined threshold set for each row, where the first and the second windows are located in one frame, the second pixel is located in a second field adjacent to a first field where the first window is located, and a position of the second pixel in the second field corresponds to a position of the pixel to be interpolated in the first field.

Optionally, the determination module may further include a second determination unit, configured to: select a third window by taking the pixel to be interpolated as a center, where the third window includes at least two rows of pixels having known pixel values, calculate pixel value differences between each pixel in the at least two rows and a corresponding pixel in the previous frame, sum absolute values of the differences for each of the at least two rows to obtain sums in each row, determine whether the sum in each row is smaller than a predetermined threshold set for each row, where the number of rows included in the third window is equal to the number of rows included in the first window, and the number of columns included in the third window is greater than the number of columns included in the first window; and select a fourth window by taking the first pixel as a center, where the fourth window includes at least one row of pixels having known pixel values, calculate pixel value differences between each pixel in the at least one row and a corresponding pixel in the previous frame, sum absolute values of the differences for each of the at least one row to obtain sums in each row, and determine whether the sum in each row is smaller than a predetermined threshold set for each row.

Optionally, the second processing module may include: a gradient band determination unit, configured to: when the pixel to be interpolated is in the moving mode, determine gradient bands along a plurality of directions by taking the pixel to be interpolated as a center; a direction calculation unit, configured to: determine a direction of the pixel to be interpolated based on the gradient bands; and an interpolation unit, configured to: set the pixel value of the pixel to be interpolated by interpolation based on the direction.

Optionally, the second processing module may further include a downsampling unit, configured to: perform downsampling to the gradient bands along the plurality of directions to obtain simplified gradient bands along the plurality of directions.

Optionally, the second processing module may be configured to: compare normalized first-order differential values of gradient bands on each direction; determine a direction having a smallest normalized first-order differential value as a first direction, and a direction having a second smallest normalized first-order differential value as a second direction; and if an absolute value of a first difference between the normalized first-order differential value of gradient band on the first direction and the normalized first-order differential value of gradient band on the second direction is greater than a predetermined value, determine the first direction as the direction of the pixel to be interpolated.

Optionally, the second processing module may be further configured to: if the absolute value of the first difference between the normalized first-order differential value of gradient band on the first direction and the normalized first-order differential value of gradient band on the second direction is smaller than the predetermined value, determine a third direction symmetric with the first direction and a fourth direction symmetric with the second direction; determine an absolute value of a second difference between the normalized first-order differential value of gradient band on the first direction and a normalized first-order differential value of gradient band on the third direction, and an absolute value of a third difference between the normalized first-order differential value of gradient band on the second direction and a normalized first-order differential value of gradient band on the fourth direction; if the absolute value of the second difference is greater than the absolute value of the third difference, determine the first direction as the direction of the pixel to be interpolated; and if the absolute value of the second difference is smaller than or equal to the absolute value of the third difference, determine the second direction as the direction of the pixel to be interpolated.

In an embodiment of the present disclosure, a method for de-interlacing a television signal is provided, including: determining whether a pixel to be interpolated is in a strictly static mode; if it is determined that the pixel to be interpolated is in the strictly static mode, obtaining a pixel value of a first pixel in a following field which corresponds to the pixel to be interpolated and setting a pixel value of the pixel to be interpolated to be equal to the pixel value of the first pixel in the following field, or, obtaining a pixel value of a second pixel in a previous field which corresponds to the pixel to be interpolated and the pixel value of the first pixel in the following field which corresponds to the pixel to be interpolated, and setting the pixel value of the pixel to be interpolated to be equal to an average value of the pixel value of the second pixel and the pixel value of the first pixel; and if it is determined that the pixel to be interpolated is not in the strictly static mode, determining gradient bands along a plurality of directions by taking the pixel to be interpolated as a center, determining a direction of the pixel to be interpolated based on the gradient bands, and setting the pixel value of the pixel to be interpolated by interpolation based on the direction.

In an embodiment of the present disclosure, an apparatus for de-interlacing a television signal is provided, including: a determination module, configured to determine whether a pixel to be interpolated is in a strictly static mode; a first processing module, configured to: if it is determined that the pixel to be interpolated is in the strictly static mode, obtain a pixel value of a first pixel in a following field which corresponds to the pixel to be interpolated and set a pixel value of the pixel to be interpolated to be equal to the pixel value of the first pixel in the following field, or, obtain a pixel value of a second pixel in a previous field which corresponds to the pixel to be interpolated and the pixel value of the first pixel in the following field which corresponds to the pixel to be interpolated, and set the pixel value of the pixel to be interpolated to be equal to an average value of the pixel value of the second pixel and the pixel value of the first pixel; and a second processing module, configured to: if it is determined that the pixel to be interpolated is not in the strictly static mode, determine gradient bands along a plurality of directions by taking the pixel to be interpolated as a center, determine a direction of the pixel to be interpolated based on the gradient bands, and set the pixel value of the pixel to be interpolated by interpolation based on the direction.

From above, in embodiments of the present disclosure, method and apparatus for de-interlacing a television signal are provided. Whether a pixel to be interpolated is in a strictly static mode is determined. If the pixel to be interpolated is in the strictly static mode, a pixel value of a first pixel in a previous field which corresponds to the pixel to be interpolated is obtained, and a pixel value of the pixel to be interpolated is set to be equal to the pixel value of the first pixel in the previous field. In this way, the pixel to be interpolated may obtain an accurate pixel value. If the pixel to be interpolated is not in the strictly static mode, i.e., in a moving mode, gradient bands along a plurality of directions are determined by taking the pixel to be interpolated as a center, which may improve the precision of detecting the direction of the pixel to be interpolated. Afterward, the direction of the pixel to be interpolated is determined based on the gradient bands, and the pixel value of the pixel to be interpolated is set by interpolation based on the direction. As the direction is determined with relatively high precision, the pixel value of the pixel to be interpolated may be more accurate. Therefore, by the method or apparatus, the accuracy of the pixel value of the pixel to be interpolated may be improved.

BRIEF DESCRIPTION OF THE DRAWINGS

In order to clarify solutions of embodiments of the present disclosure or related art, accompanying drawings of the present disclosure or the related art will be described briefly. Obviously, the drawings are just examples and do not limit the scope of the disclosure, and other drawings may be obtained by a person skilled in the art based on these drawings without creative work.

DETAILED DESCRIPTION OF THE DISCLOSURE

As described in the background, in existing techniques, directions of missing pixels are deduced based on known pixels, and pixel values of the missing pixels are obtained by performing interpolation to the known pixels at the deduced directions. Regarding the disadvantage (1) described in the background, embodiments of the present disclosure provide a de-interlacing algorithm based on detection of strictly static scenario. Regarding the disadvantage (2) described in the background, embodiments of the present disclosure provide a banded gradient calculating method and a method for downsampling gradient bands to simplify them, which can obtain better performance at the cost of a little greater computational complexity and a little logics.

Embodiments of present disclosure will be described clearly in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

In order to clarify the objects, characteristics and advantages of the disclosure, embodiments of present disclosure will be described in detail in conjunction with accompanying drawings.

Figure 1:
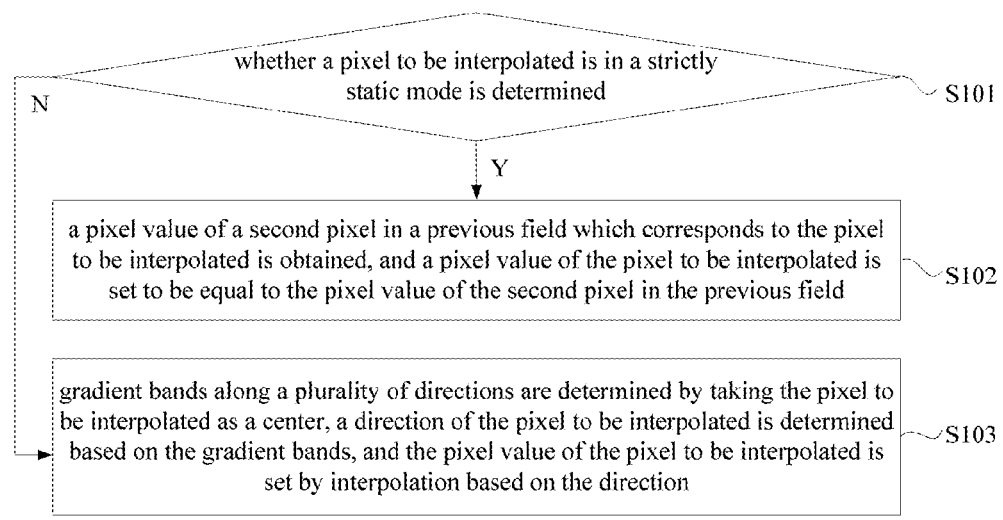
FIG. 1 schematically illustrates a flow chart of a method for de-interlacing a television signal according to an embodiment of the disclosure.

FIG. 1 schematically illustrates a flow chart of a method for de-interlacing a television signal according to an embodiment of the disclosure. Referring to FIG. 1, the method may include S101 to S103.

In S101, whether a pixel to be interpolated is in a strictly static mode is determined; if the pixel to be interpolated is in the strictly static mode, the method goes to S102, or if the pixel to be interpolated is not in the strictly static mode, the method goes to S103.

In some embodiments, S101 may include following steps. A first window is selected by taking the pixel to be interpolated as a center, where the first window includes at least two rows of pixels having known pixel values. Pixel value differences between each pixel in the at least two rows and a corresponding pixel in a previous frame are calculated; absolute values of the differences are summed for each of the at least two rows to obtain sums in each row; and whether the sum in each row is smaller than a predetermined threshold set for each row is determined. A second window is selected by taking a first pixel as a center, where the second window includes at least one row of pixels having known pixel values. Pixel value differences between each pixel in the at least two rows and a corresponding pixel in a previous frame are calculated; absolute values of the differences are summed for each of the at least two rows to obtain sums in each row; and whether the sum in each row is smaller than a predetermined threshold set for each row is determined. The first and the second windows are located in one frame, the first pixel is located in a first field adjacent to a second field where the first window is located, and a position of the first pixel in the first field corresponds to a position of the pixel to be interpolated in the second field (for example, in FIG. 2, the first pixel and a second pixel (a pixel in a previous field which corresponds to the pixel to be interpolated) is a same pixel, i.e., pixel Bmid0 in a field src_col). The predetermined threshold is related to a noise level. In some embodiments, the predetermined threshold is times of the noise level.

It should be noted that, one pixel in a first field corresponds to another pixel in a second field means a row number and a column number of the one pixel in the first field are same with a row number and a column number of the another pixel in the second field.

Figure 2:
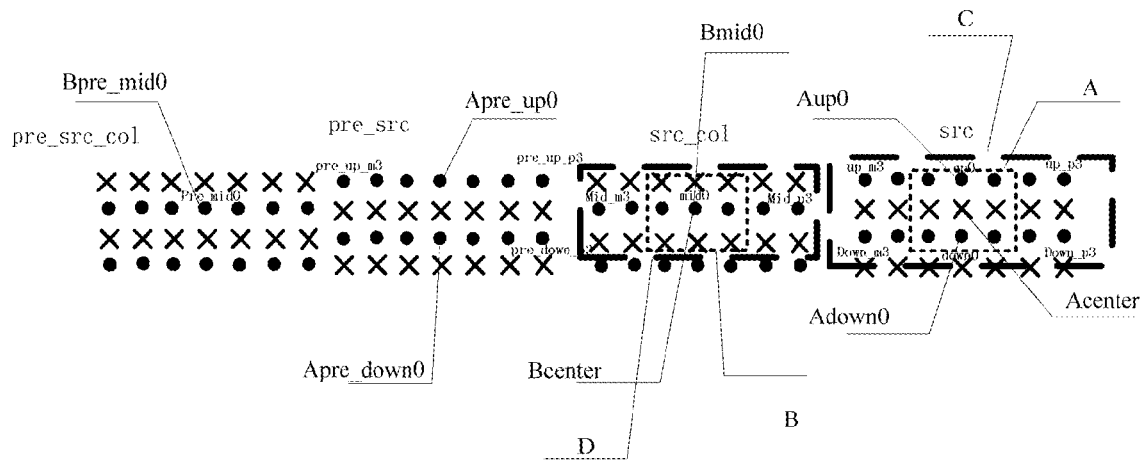
FIG. 2 schematically illustrates a diagram of constraint of video stream in determination of a strictly static mode according to an embodiment of the disclosure.

FIG. 2 schematically illustrates a diagram of constraint of video stream in determination of a strictly static mode according to an embodiment of the disclosure. Referring to FIG. 2, src_col and src are a front field and a rear field in a current frame (called a second frame), respectively, and pre_src_col and pre_src are a front field and a rear field in a previous frame (called a first frame), respectively. pre_src_col and pre_src are a bottom field and a top field of the first frame, respectively; and src_col and src are a bottom field and a top field of the second frame, respectively.

Figure 8:
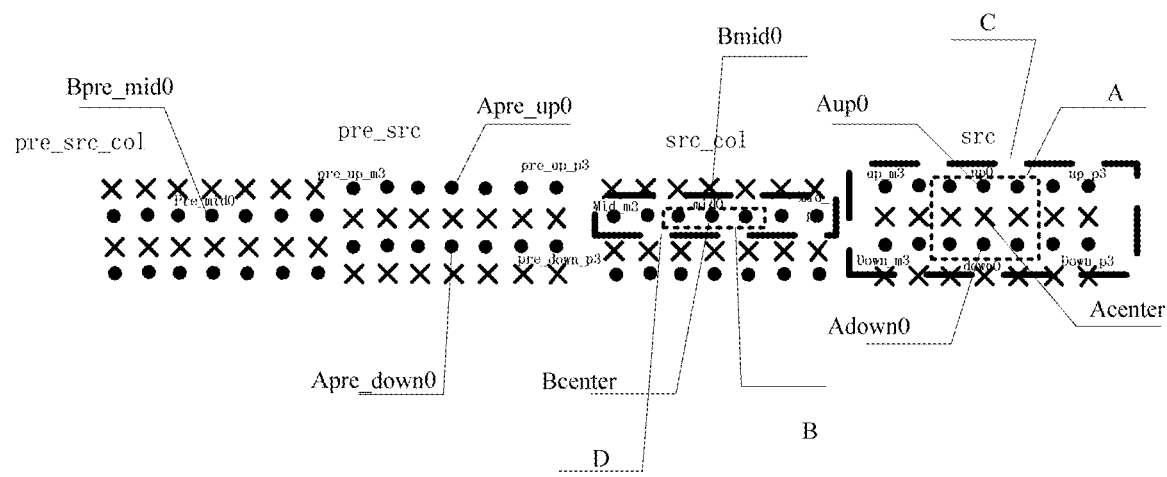
FIG. 8 schematically illustrates a diagram of constraint of video stream in determination of a strictly static mode according to an embodiment of the disclosure.

Frames can be scanned according to an order of top field first and bottom field later, or an order of bottom field first and top field later. Referring to FIGS. 2 and 8, if a top field is scanned first and a bottom field is scanned later, the scan order may be: pre_src field-pre_src_col field-src field-src_col field. If a bottom field is scanned first and a top field is scanned later, the scan order may be: pre_src_col field-pre_src field-src_col field-src field.

Optionally, the first window A is a 3-by-3 window (including three rows and three columns) and has a center Acenter, i.e., the pixel to be interpolated. The second window B is also a 3-by-3 window and has a center Bcenter, i.e., mid0. No matter the second window B is a 1-by-3 window or a 3-by-3 window, computation results are the same. In FIGS. 2 and 8, both dots "•" and crosses"x" represent pixels, where the dots "•" represent the pixels having known pixel values, while the crosses"x" represent the pixels having unknown pixel values. The first window A and the second window B are strongly restrained.

In the embodiment, windows used in computation may have three columns or seven columns (corresponding to strong restrain and weak restrain). However, the present disclosure is not limited thereto. In practice, a number of columns of a window are adjusted according to detailed situations. In some embodiments, the number of columns of the window may be an odd number no less than three (left columns are symmetric with right columns). In some embodiments, if both strong restrain and weak restrain are employed, a window for strong restrain includes fewer columns than a window for weak restrain. For example, the window for strong restrain includes three columns and the window for weak restrain includes seven columns. For another example, the window for strong restrain includes five columns and the window for weak restrain includes eleven columns.

The first window A and the second window B includes pixels adjacent to the pixel to be interpolated. The rows Aup and Adown in the first window A are adjacent to the row where the pixel to be interpolated is located (i.e., row Amid) in position. The row Bmid in the second window B (and pixels located in a bottom field in a previous frame (i.e., pre_src_col) which correspond to the row Bmid in the second window B) is adjacent to the row where the pixel to be interpolated is located in time (i.e., row Amid). As described above, if a top field is scanned first and a bottom field is scanned later, the scan order may be: pre_src field-pre_src_col field-src field-src_col field. It can be seen that the fields src_col and pre_src_col are adjacent to the field src in ime.

It can be understood that, although the second window B in FIG. 2 includes three rows, pixel values in rows Bup and Bdown are unknown. Therefore, when whether the pixel to be interpolated Acenter is in the strictly static mode is determined, pixels in row Bmid in the second window B are used for computation. Referring to FIGS. 2 and 8, the second window B used in FIG. 2 is 3-by-3, the second window B used in FIG. 8 is 1-by-3, and the computation results of them are the same.

Please refer to FIG. 2 and the following formulas. To the strong restrain (that is, the first window A in the field src and the second window B in the field src_col), $$\begin{cases} \|up0 - \text{pre\_up0}\| + \|\text{up\_m1} - \text{pre\_up\_m1}\| + \\ \quad \|\text{up\_p1} - \text{pre\_up\_p1}\| \le \text{NL\_up}^*Coffe1 \\ \|mid0 - \text{pre\_mid0}\| + \|\text{mid\_m1} - \text{pre\_mid\_m1}\| + \\ \quad \|\text{mid\_p1} - \text{pre\_mid\_p1}\| \le \text{NL\_mid}^*Coffe1 \\ \|down0 - \text{pre\_down0}\| + \|\text{down\_m1} - \text{pre\_down\_m1}\| + \\ \quad \|\text{down\_p1} - \text{pre\_down\_p1}\| \le \text{NL\_down}^*Coffe1 \end{cases}$$

where up0 represents a pixel value of a pixel Aup0 above the pixel Acenter, up_m1 represents a pixel value of a pixel which is adjacent to and on the left of the pixel Aup0, up_p1 represents a pixel value of a pixel which is adjacent to and on the right of the pixel Aup0, pre_up0 represents a pixel value of a pixel Apre_up0 which corresponds to the pixel Aup0 in the previous frame, pre_up_m1 represents a pixel value of a pixel which is adjacent to and on the left of the pixel Apre_up0, pre_up_p1 represents a pixel value of a pixel which is adjacent to and on the right of the pixel Apre_up0, NL_up represents a noise level at a row where the pixel Aup0 is located, Coffee1 is a constant, down0 represents a pixel value of a pixel Adown0 under the pixel Acenter, down_m1 represents a pixel value of a pixel which is adjacent to and on the left of the pixel Adown0, down_p1 represents a pixel value of a pixel which is adjacent to and on the right of the pixel Adown0, pre_down0 represents a pixel value of a pixel Apre_down0 which corresponds to the pixel Adown0 in the previous frame, pre_down_m1 represents a pixel value of a pixel which is adjacent to and on the left of the pixel Apre_down0, pre_down_p1 represents a pixel value of a pixel which is adjacent to and on the right of the pixel Apre_down0, NL_down represents a noise level at a row where the pixel Adown0 is located.

Referring to FIGS. 2 and 8, pixel values in rows Bup and Bdown are unknown. Therefore, when whether the pixel to be interpolated Acenter is in the strictly static mode is determined, pixels in row Bmid in the second window B are used for computation.

The second pixel Bcenter (i.e., mid0, or pixel Bmid0) is located at the center of the second window, mid_m1 represents a pixel value of a pixel which is adjacent to the pixel Bmid0 at the left side, mid_p1 represents a pixel value of a pixel which is adjacent to the pixel Bmid0 at the right side, pre_mid0 represents a pixel value of a pixel Bpre_mid0 (i.e., pre_mid_0) which corresponds to the pixel Bmid0 in the previous frame, pre_mid_m1 represents a pixel value of a pixel which is adjacent to the pixel Bpre_mid0 at the left side, pre_mid_p1 represents a pixel value of a pixel which is adjacent to the pixel Bpre_mid0 at the right side, NL_mid represents a noise level at a row where the pixel Bmid0 is located.

In some embodiments, to improve accuracy of the determination, weak restraint is also employed. A third window is selected by taking the pixel to be interpolated as a center, where the third window includes at least two rows of pixels having known pixel values. Pixel value differences between each pixel in the at least two rows and a corresponding pixel in a previous frame are calculated; absolute values of the differences are summed for each of the at least two rows to obtain sums in each row; and whether the sum in each row is smaller than a predetermined threshold set for each row is determined. The number of rows included in the third window is equal to the number of rows included in the first window, and the number of columns included in the third window is greater than the number of columns included in the first window. A fourth window is selected by taking the first pixel as a center, where the fourth window includes at least one row of pixels having known pixel values. Pixel value differences between each pixel in the at least one row and a corresponding pixel in a previous frame are calculated; absolute values of the differences are summed for each of the at least one row to obtain sums in each row; and whether the sum in each row is smaller than a predetermined threshold set for each row is determined. Similarly, the number of rows included in the fourth window is equal to the number of rows included in the second window, and the number of columns included in the fourth window is greater than the number of columns included in the second window.

Referring to FIG. 2, the third window C and the fourth window D are weakly restrained. The third window C and the fourth window D are 3-by-7 windows (including three rows and seven columns). The fourth window B used in FIG. 2 is 3-by-7, the fourth window B used in FIG. 8 is 1-by-7, and the computation results of them are the same. Please refer to FIG. 2 and the following formulas. To the weak restrain (that is, the third window C in the field src and the fourth window D in the field src_col), $$\begin{cases} \|up0 - \text{pre\_up0}\| + \sum_{i=1}^{3}(\|\text{up\_mi} - \text{pre\_up\_mi}\| + \\ \quad \|\text{up\_pi} - \text{pre\_up\_pi}\|) \le \text{NL\_up}^*7^*Coffe2 \\ \|mid0 - \text{pre\_mid0}\| + \sum_{i=1}^{3}(\|\text{mid\_mi} - \text{pre\_mid\_mi}\| + \\ \quad \|\text{mid\_pi} - \text{pre\_mid\_pi}\|) \le \text{NL\_mid}^*7^*Coffe2 \\ \|down0 - \text{pre\_down0}\| + \sum_{i=1}^{3}(\|\text{down\_mi} - \text{pre\_down\_mi}\| + \\ \quad \|\text{down\_pi} - \text{pre\_down\_pi}\|) \le \text{NL\_down}^*7^*Coffe2 \end{cases}$$

Referring to FIGS. 2 and 8, pixel values in rows Bup and Bdown are unknown. Therefore, when whether the pixel to be interpolated Acenter is in the strictly static mode is determined, pixels in row Dmid in the fourth window D are used for computation.

Coffee2 is a constant, and meanings of other parameters in the above formulas can be referred to the description about the strong restraint and are not described in detail here. In some embodiments, Coffee1 is smaller than Coffee 2.

Noise level may be different under different brightness, that is, the noise level may change due to the variation of position (i.e., different rows may use different noise levels NL).

In some embodiments, the strong restraint is used in determining whether the pixel to be interpolated is in a strictly static mode. In some embodiments, both the strong restraint and the weak restraint are used in determining whether the pixel to be interpolated is in a strictly static mode. It should be noted that, the present disclosure is not limited thereto.

In some embodiments, there may be one window or a plurality of windows, such as two windows (one is strong restrain, another is weak restrain). The size of the window may be adjusted according to practical situations. In some embodiments, the number of columns of the window may be an odd number no less than three. If a center of the window is the pixel to be interpolated (that is, the center pixel in the window is unknown), a number of rows of the window may be an odd number no less than three (that is, the window should include at least two rows of pixels having known pixel values). If the center pixel of the window has a known pixel value, the number of rows of the window may be an odd number no less than one (that is, the window should include at least one row of pixels having known pixel values).

In some embodiments, a plurality of windows may be used. If computation results according to the plurality of windows are "the pixel to be interpolated is in the strictly static state", the pixel to be interpolated is determined to be in the strictly static state. If at least one computation result according to at least one of the plurality of windows is "the pixel to be interpolated is not in the strictly static state", the pixel to be interpolated is determined to be not in the strictly static state.

In S102, a pixel value of a second pixel in a previous field which corresponds to the pixel to be interpolated is obtained, and a pixel value of the pixel to be interpolated is set to be equal to the pixel value of the second pixel in the previous field.

It should be noted that, the second pixel in the previous field means the second pixel being located in a frame where the pixel to be interpolated is located and in the field previous to a field where the pixel to be interpolated is located.

Optionally, in some embodiments, a pixel value of a third pixel in a following field which corresponds to the pixel to be interpolated is obtained, and the pixel value of the pixel to be interpolated is set to be equal to the pixel value of the third pixel in the following field.

Optionally, in some embodiments, the pixel values of both the second pixel in the previous field and the third pixel in the following field are obtained, and the pixel value of the pixel to be interpolated is set to be equal to an average value of the pixel value of the second pixel in the previous field and the pixel value of the third pixel in the following field.

In S103, gradient bands along a plurality of directions are determined by taking the pixel to be interpolated as a center, a direction of the pixel to be interpolated is determined based on the gradient bands, and the pixel value of the pixel to be interpolated is set by interpolation based on the direction.

In some embodiments, the gradient bands along the plurality of directions may include gradient bands along three directions.

Figure 3A:
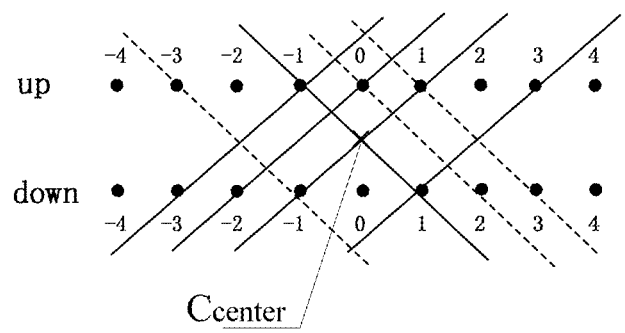
FIG. 3A schematically illustrates a diagram of a gradient band according to an embodiment of the disclosure.
Figure 3B:
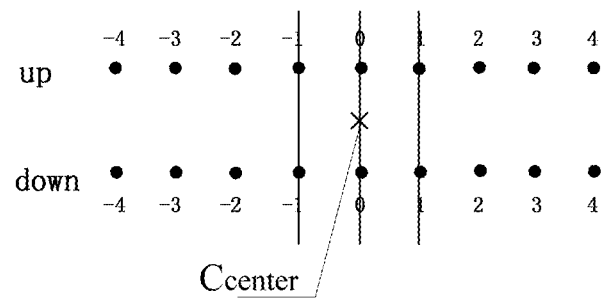
FIG. 3B schematically illustrates a diagram of a gradient band according to another embodiment of the disclosure.

FIG. 3A schematically illustrates a diagram of a gradient band according to an embodiment of the disclosure, and FIG. 3B schematically illustrates a diagram of a gradient band according to another embodiment of the disclosure. Referring to FIGS. 3A and 3B, three directions of gradient bands are illustrated, including a vertical direction, a direction up-1 ↔ down1 defined by a straight line between pixel up-1 (i.e., pixel at row up and column "-1" in FIG. 3A) and pixel down1 (i.e., pixel at row down and column "1" in FIG. 3A) and a direction down-1 ↔ up1. In FIGS. 3A and 3B, the center is shown as Ccenter. In some embodiments, the above three directions are considered, and a banded gradient algorithm using five gradient lines is required as illustrated in FIG. 3A. Based on analysis, it is found that this band of five gradient lines can detect a direction even its width is only the width of one pixel. Each line represents an absolute value of first-order differential at the direction, namely, an absolute value of the difference between pixel values of two adjacent pixels on the line.

In some embodiments, determining the direction of the pixel to be interpolated based on the gradient bands may include: comparing normalized first-order differential values of gradient bands on each direction; determining a direction having a smallest normalized first-order differential value as a first direction, and a direction having a second smallest normalized first-order differential value as a second direction; and if an absolute value of a first difference between the normalized first-order differential value of gradient band on the first direction and the normalized first-order differential value of gradient band on the second direction is greater than a predetermined value, and determining the first direction as the direction of the pixel to be interpolated.

For example, a normalized first-order differential value on the vertical direction is:

$$[|(up-1)-(down-1)|+|(up0)-(down0)|+|(up1)-(down1)|]/3.$$

Normalized first-order differential values of gradient bands on other two directions up-1 ↔ down1 and down-1 ↔ up1 may be calculated similarly.

In some embodiments, if the absolute value of the first difference between the normalized first-order differential value of gradient band on the first direction and the normalized first-order differential value of gradient band on the second direction is smaller than the predetermined value, determining a third direction symmetric with the first direction and a fourth direction symmetric with the second direction (the symmetry is about a vertical direction); calculating an absolute value of a second difference between the normalized first-order differential value of gradient band on the first direction and a normalized first-order differential value of gradient band on the third direction, and an absolute value of a third difference between the normalized first-order differential value of gradient band on the second direction and a normalized first-order differential value of gradient band on the fourth direction; if the absolute value of the second difference is greater than the absolute value of the third difference, determining the first direction as the direction of the pixel to be interpolated; and if the absolute value of the second difference is smaller than or equal to the absolute value of the third difference, determining the second direction as the direction of the pixel to be interpolated.

For example, if the first-order differential values of gradient bands on directions up-1 ↔ down1 and up-2 ↔ down2 are smaller than the predetermined threshold and have a small difference between each other, and a difference Δ1 between first-order differential values of gradient bands on directions up-1 ↔ down1 and down1 ↔ up-1 is much smaller than a difference Δ2 between first-order differential values of gradient bands on directions up-2 ↔ down2 and down2 ↔ up-2, the direction of the pixel to be interpolated is determined to be the direction up-2 ↔ down2.

In some embodiments, after the direction of the pixel to be interpolated is determined, interpolation of the direction is performed. For example, if the direction of the pixel to be interpolated is up-1 ↔ down1, the interpolation is as follows:

$$Intp\_value=(up-1\_value+down1\_value)/2,$$

where Intp_value represents a predetermined pixel value of the pixel to be interpolated, up-1_value represents a pixel value of a pixel at row up and column "-1", and down1_value represents a pixel value of a pixel at row down and column "1".

In some embodiments, the pixel value of the pixel to be interpolated may be obtained by fusing the predetermined pixel value Intp_value with data in a previous field. In the fusion, whether relative relationship is moving or static is considered. For example, difference between up0_value and pre_up0_value, difference between down0_value and pre_down0_value, and difference between (up0_value+down0_value)/2 and mid0_value are combined to allocate coefficients for fusing (up0_value+down0_value)/2 and Intp_value to obtain the pixel value of the pixel to be interpolated. In some embodiments, the predetermined pixel value Intp_value and the pixel value of the pixel to be interpolated determined in the static mode are added with respective weight to obtain the final pixel value of the pixel to be interpolated.

In some embodiments, in S103, before the direction of the pixel to be interpolated is determined based on the gradient bands, downsampling is performed to the gradient bands along the plurality of directions to obtain simplified gradient bands along the plurality of directions.

Downsampling methods are various. To determine an accurate direction of the pixel to be interpolated, the gradient bands along a direction should include critical pixels on the direction and had better include critical pixels on other directions.

Critical pixels on a direction stand for pixels which represent scan of the direction. For example, pixels up−1 and down 1 are the critical pixels on the direction up−1 ↔ down1.

Figure 4:
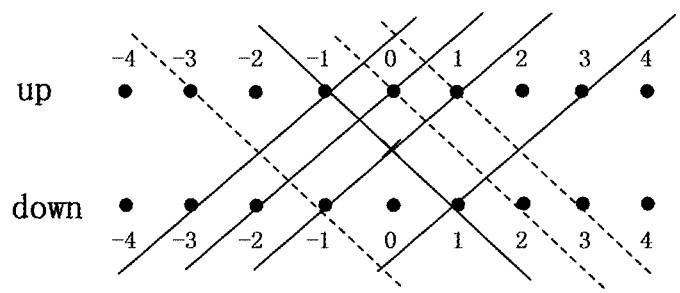
FIG. 4 schematically illustrates a diagram of a gradient band after downsampling according to an embodiment of the disclosure.

FIG. 4 schematically illustrates a diagram of gradient bands after downsampling according to an embodiment of the disclosure. Gradient bands in FIG. 4 are obtained by performing downsampling to the gradient bands in FIG. 3A. After performing downsampling to the gradient bands in FIG. 3B, the downsampled gradient bands are same as those in FIG. 3B. By the downsampling, calculation complexity may be simplized.

In embodiments of the present disclosure, method and apparatus for de-interlacing a television signal are provided. Whether a pixel to be interpolated is in a strictly static mode is determined. If the pixel to be interpolated is in the strictly static mode, a pixel value of a second pixel in a previous field which corresponds to the pixel to be interpolated is obtained, and a pixel value of the pixel to be interpolated is set to be equal to the pixel value of the second pixel in the previous field. In this way, the pixel to be interpolated may obtain an accurate pixel value. If the pixel to be interpolated is not in the strictly static mode, i.e., in a moving mode, gradient bands along a plurality of directions are determined by taking the pixel to be interpolated as a center, which may improve the precision of detecting the direction of the pixel to be interpolated. Afterward, the direction of the pixel to be interpolated is determined based on the gradient bands, and the pixel value of the pixel to be interpolated is set by interpolation based on the direction. As the direction is determined with relatively high precision, the pixel value of the pixel to be interpolated may be more accurate. Therefore, by the method or apparatus, the accuracy of the pixel value of the pixel to be interpolated may be improved.

Accordingly, in an embodiment, an apparatus for de-interlacing a television signal is provided.

Figures 5, 6A, 6B:
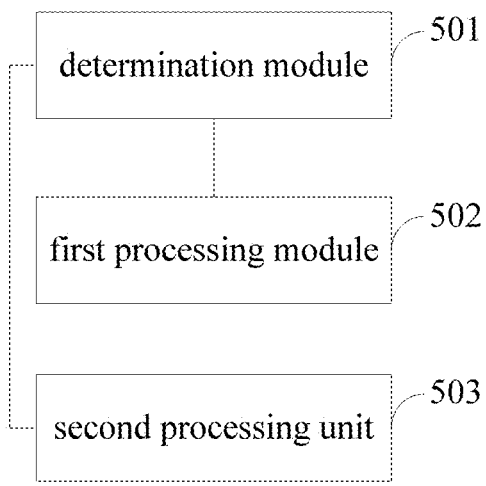
FIG. 5 schematically illustrates a structural diagram of an apparatus for de-interlacing a television signal according to an embodiment of the disclosure.
FIG. 6A schematically illustrates a first original image which is not undergone processing for a strictly static mode according to an embodiment of the disclosure.
FIG. 6B schematically illustrates a first processed image which is obtained by performing processing for a strictly static mode to the first original image in FIG. 6A according to an embodiment of the disclosure.

FIG. 5 schematically illustrates a structural diagram of an apparatus for de-interlacing a television signal according to an embodiment of the disclosure. Referring to FIG. 5, the apparatus includes a determination module 501, a first processing module 502 and a second processing module 503.

The determination module 501 may be configured to determine whether a pixel to be interpolated is in a strictly static mode.

The first processing module 502 may be configured to: if it is determined that the pixel to be interpolated is in the strictly static mode, obtain a pixel value of a first pixel in a previous field which corresponds to the pixel to be interpolated, and set a pixel value of the pixel to be interpolated to be equal to the pixel value of the first pixel in the previous field.

The second processing module 503 may be configured to: if it is determined that the pixel to be interpolated is not in the strictly static mode (i.e., in a moving mode), determine gradient bands along a plurality of directions by taking the pixel to be interpolated as a center, determine a direction of the pixel to be interpolated based on the gradient bands, and set the pixel value of the pixel to be interpolated by interpolation based on the direction.

In some embodiments, the first processing module 502 may be configured to: obtain a pixel value of a second pixel in a following field which corresponds to the pixel to be interpolated and setting the pixel value of the pixel to be interpolated to be equal to the pixel value of the second pixel in the following field. In some embodiments, the first processing module 502 may be configured to: obtaining the pixel value of the first pixel in the previous field which corresponds to the pixel to be interpolated and the pixel value of the second pixel in the following field which corresponds to the pixel to be interpolated, and setting the pixel value of the pixel to be interpolated to be equal to an average value of the pixel value of the first pixel and the pixel value of the second pixel.

In some embodiments, the determination module 501 may include a first determination unit, configured to: select a first window by taking the pixel to be interpolated as a center, where the first window includes at least two rows of pixels having known pixel values; calculate pixel value differences between each pixel in the at least two rows and a corresponding pixel in a previous frame; sum absolute values of the differences for each of the at least two rows to obtain sums in each row; determine whether the sum in each row is smaller than a predetermined threshold set for each row; select a second window by taking a third pixel as a center, where the second window includes at least one row of pixels having known pixel values; calculate pixel value differences between each pixel in the at least one row and a corresponding pixel in a previous frame; sum absolute values of the differences for each of the at least two rows to obtain sums in each row; and determine whether the sum in each row is smaller than a predetermined threshold set for each row, where the first and the second windows are located in one frame, the third pixel is located in a first field adjacent to a second field where the first window is located, and a position of the third pixel in the first field corresponds to a position of the pixel to be interpolated in the second field.

In some embodiments, the determination module 501 may further include a second determination unit, configured to: select a third window by taking the pixel to be interpolated as a center, where the third window includes at least two rows of pixels having known pixel values; calculate pixel value differences between each pixel in the at least two rows and a corresponding pixel in a previous frame; sum absolute values of the differences for each of the at least two rows to obtain sums in each row; determine whether the sum in each row is smaller than a predetermined threshold set for each row, where the number of rows included in the third window is equal to the number of rows included in the first window, and the number of columns included in the third window is greater than the number of columns included in the first window; select a fourth window by taking the third pixel as a center, where the fourth window includes at least one row of pixels having known pixel values; calculate pixel value differences between each pixel in the at least one row and a corresponding pixel in a previous frame; sum absolute values of the differences for each of the at least one row to obtain sums in each row; and determine whether the sum in each row is smaller than a predetermined threshold set for each row.

In some embodiments, there may be one window or a plurality of windows, such as two windows (one is strong restrain, another is weak restrain). The size of the window may be adjusted according to practical situations. In some embodiments, the number of columns of the window may be an odd number no less than three. If a center of the window is the pixel to be interpolated (that is, the center pixel in the window is unknown), a number of rows of the window may be an odd number no less than three (that is, the window should include at least two rows of pixels having known pixel values). If the center pixel of the window has a known pixel value, the number of rows of the window may be an odd number no less than one (that is, the window should include at least one row of pixels having known pixel values).

In some embodiments, strong restraint is used in determining whether the pixel to be interpolated is in a strictly static mode. In some embodiments, both strong restraint and weak restraint are used in determining whether the pixel to be interpolated is in a strictly static mode. In some embodiments, a plurality of windows may be used. If computation results according to the plurality of windows are "the pixel to be interpolated is in the strictly static state", the pixel to be interpolated can be determined to be in the strictly static state. If at least one computation result according to at least one of the plurality of windows is "the pixel to be interpolated is not in the strictly static state", the pixel to be interpolated may be determined to be not in the strictly static state.

In some embodiments, the second processing module 503 may include: a gradient band determination unit, configured to: when the pixel to be interpolated is in the moving mode, determine gradient bands along a plurality of directions by taking the pixel to be interpolated as a center; a direction calculation unit, configured to: determine a direction of the pixel to be interpolated based on the gradient bands; and an interpolation unit, configured to: set the pixel value of the pixel to be interpolated by interpolation based on the direction.

In some embodiments, the second processing module 503 may further include a downsampling unit, configured to: perform downsampling to the gradient bands along the plurality of directions to obtain simplified gradient bands along the plurality of directions.

Optionally, the second processing module 503 may be configured to: compare normalized first-order differential values of gradient bands on each direction; determine a direction having a smallest normalized first-order differential value as a first direction, and a direction having a second smallest normalized first-order differential value as a second direction; and if an absolute value of a first difference between the normalized first-order differential value of gradient band on the first direction and the normalized first-order differential value of gradient band on the second direction is greater than a predetermined value, determine the first direction as the direction of the pixel to be interpolated.

Optionally, the second processing module 503 may be further configured to: if the absolute value of the first difference between the normalized first-order differential value of gradient band on the first direction and the normalized first-order differential value of gradient band on the second direction is smaller than the predetermined value, determine a third direction symmetric with the first direction and a fourth direction symmetric with the second direction; determine an absolute value of a second difference between the normalized first-order differential value of gradient band on the first direction and a normalized first-order differential value of gradient band on the third direction, and an absolute value of a third difference between the normalized first-order differential value of gradient band on the second direction and a normalized first-order differential value of gradient band on the fourth direction; if the absolute value of the second difference is greater than the absolute value of the third difference, determine the first direction as the direction of the pixel to be interpolated; and if the absolute value of the second difference is smaller than or equal to the absolute value of the third difference, determine the second direction as the direction of the pixel to be interpolated.

Figure 7A:
FIG. 7A schematically illustrates a second original image which is not undergone processing for a motion scenario mode according to an embodiment of the disclosure.
Figure 7B:
FIG. 7B schematically illustrates a second processed image which is obtained by performing processing for a motion scenario mode to the second original image in FIG. 7A according to an embodiment of the disclosure.

Embodiments of the present disclosure further provide effect diagrams. FIG. 6A chematically illustrates a first original image which is not undergone processing for a strictly static mode according to an embodiment of the disclosure. FIG. 6B schematically illustrates a first processed image which is obtained by performing processing for a strictly static mode to the first original image in FIG. 6A according to an embodiment of the disclosure. FIG. 7A schematically illustrates a second original image which is not undergone processing for a motion scenario mode according to an embodiment of the disclosure. FIG. 7B schematically illustrates a second processed image which is obtained by performing processing for a motion scenario mode to the second original image in FIG. 7A according to an embodiment of the disclosure. Specifically, the second processed image in FIG. 7B is obtained by performing a banded gradient algorithm to the second original image in FIG. 7A.

In embodiments of the present disclosure, relationship terms, such as first and second, are used only to distinguish one entity or action from another entity or action, but not necessarily require or imply such entities or actions have any actual relationship or order. The terms "comprising", "including" or any other variants aim to cover non-exclusive containing, so that a process, a method, an object or an equipment which includes a series of elements not only includes those elements, but also may include other elements not explicitly listed or other inherent elements of such procedure, method, object, or equipment. In situations without no more limitation, when it is described that a process, a method, an object or an equipment include one particular element, it does not exclude that the process, the method, the object, or the equipment includes another the same particular element.

In the present disclosure, the various embodiments are described in a progressive way. The focus of each embodiment is different from that of other embodiments. And the same or the similar parts between the respective embodiments can refer to each other. To apparatus disclosed in the embodiments, as it corresponds to the method disclosed, the description of the apparatus is relatively simple and some details may be referred to the description of the method.

Steps of methods or algorithms described in the embodiments of the present disclosure can be implemented by hardware, software modules executed by a processor, or combination thereof. The software modules may be disposed in Random Access Memory (RAM), memory, Read Only Memory (ROM), Electrically Programmable Read-Only-Memory (EPROM), Electrically Erasable Programmable Read-Only Memory (EPROM), register, hard disk, removable disk, CD-ROM or other storage medium well known in the art.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for de-interlacing a television signal, comprising:
   determining whether a pixel to be interpolated is in a strictly static mode;
   if it is determined that the pixel to be interpolated is in the strictly static mode, obtaining a pixel value of a first pixel in a previous field which corresponds to the pixel to be interpolated, and setting a pixel value of the pixel to be interpolated to be equal to the pixel value of the first pixel in the previous field; and
   if it is determined that the pixel to be interpolated is not in the strictly static mode, determining gradient bands along a plurality of directions by taking the pixel to be interpolated as a center, determining a direction of the pixel to be interpolated based on the gradient bands, and setting the pixel value of the pixel to be interpolated by interpolation based on the direction,
   wherein the method further comprises: before the direction of the pixel to be interpolated is determined based on the gradient bands, performing downsampling to the gradient bands along the plurality of directions to obtain simplified gradient bands along the plurality of directions.

2. The method according to claim 1, wherein determining whether the pixel to be interpolated is in the strictly static mode comprises:
   selecting a first window by taking the pixel to be interpolated as a center, where the first window comprises at least two rows of pixels having known pixel values, calculating pixel value differences between each pixel in the at least two rows and a corresponding pixel in a previous frame, summing absolute values of the differences for each of the at least two rows to obtain sums in each row, and determining whether the sum in each row is smaller than a predetermined threshold set for each row; and
   selecting a second window by taking a second pixel as a center, where the second window comprises at least one row of pixels having known pixel values, calculating pixel value differences between each pixel in the at least one row and a corresponding pixel in the previous frame, summing absolute values of the differences for each of the at least one row to obtain sums in each row, and determining whether the sum in each row is smaller than a predetermined threshold set for each row,
   where the first and the second windows are located in one frame, and the second pixel is located in a second field adjacent to a first field where the first window is located, and a position of the second pixel in the second field corresponds to a position of the pixel to be interpolated in the first field.

3. The method according to claim 2, wherein determining whether the pixel to be interpolated is in the strictly static mode further comprises:
   selecting a third window by taking the pixel to be interpolated as a center, where the third window comprises at least two rows of pixels having known pixel values, calculating pixel value differences between each pixel in the at least two rows and a corresponding pixel in the previous frame, summing absolute values of the differences for each of the at least two rows to obtain sums in each row, and determining whether the sum in each row is smaller than a predetermined threshold set for each row, where the number of rows included in the third window is equal to the number of rows included in the first window, and the number of columns included in the third window is greater than the number of columns included in the first window; and
   selecting a fourth window by taking the second pixel as a center, where the fourth window comprises at least one row of pixels having known pixel values, calculating pixel value differences between each pixel in the at least one row and a corresponding pixel in the previous frame, summing absolute values of the differences for each of the at least one row to obtain sums in each row, and determining whether the sum in each row is smaller than a predetermined threshold set for each row.

4. The method according to claim 1, wherein determining gradient bands along the plurality of directions comprises determining gradient bands along three directions.

5. The method according to claim 1, wherein determining the direction of the pixel to be interpolated based on the gradient bands comprises:
   comparing normalized first-order differential values of gradient bands on each direction;
   determining a direction having a smallest normalized first-order differential value as a first direction, and a direction having a second smallest normalized first-order differential value as a second direction; and
   if an absolute value of a first difference between the normalized first-order differential value of gradient band on the first direction and the normalized first-order differential value of gradient band on the second direction is greater than a predetermined value, determining the first direction as the direction of the pixel to be interpolated.

6. The method according to claim 5, wherein determining the direction of the pixel to be interpolated based on the gradient bands further comprises:
   if the absolute value of the first difference between the normalized first-order differential value of gradient band on the first direction and the normalized first-order differential value of gradient band on the second direction is smaller than the predetermined value, determining a third direction symmetric with the first direction and a fourth direction symmetric with the second direction;
   determining an absolute value of a second difference between the normalized first-order differential value of gradient band on the first direction and a normalized first-order differential value of gradient band on the third direction, and an absolute value of a third difference between the normalized first-order differential value of gradient band on the second direction and a normalized first-order differential value of gradient band on the fourth direction;
   if the absolute value of the second difference is greater than the absolute value of the third difference, determining the first direction as the direction of the pixel to be interpolated; and
   if the absolute value of the second difference is smaller than or equal to the absolute value of the third difference, determining the second direction as the direction of the pixel to be interpolated.

7. An apparatus for de-interlacing a television signal, comprising:
- a determination circuitry, configured to determine whether a pixel to be interpolated is in a strictly static mode;
- a first processing circuitry, configured to: if it is determined that the pixel to be interpolated is in the strictly static mode, obtain a pixel value of a first pixel in a previous field which corresponds to the pixel to be interpolated, and set a pixel value of the pixel to be interpolated to be equal to the pixel value of the first pixel in the previous field; and
- a second processing circuitry, configured to: if it is determined that the pixel to be interpolated is not in the strictly static mode, determine gradient bands along a plurality of directions by taking the pixel to be interpolated as a center, determine a direction of the pixel to be interpolated based on the gradient bands, and set the pixel value of the pixel to be interpolated by interpolation based on the direction,
- wherein the second processing circuitry further comprises a downsampling unit, configured to: perform downsampling to the gradient bands along the plurality of directions to obtain simplified gradient bands along the plurality of directions.

8. The apparatus according to claim 7, wherein the determination circuitry comprises a first determination unit, configured to:
- select a first window by taking the pixel to be interpolated as a center, where the first window comprises at least two rows of pixels having known pixel values, calculate pixel value differences between each pixel in the at least two rows and a corresponding pixel in a previous frame, sum absolute values of the differences for each of the at least two rows to obtain sums in each row, and determine whether the sum in each row is smaller than a predetermined threshold set for each row; and
- select a second window by taking a second pixel as a center, where the second window comprises at least one row of pixels having known pixel values, calculate pixel value differences between each pixel in the at least one row and a corresponding pixel in the previous frame, sum absolute values of the differences for each of the at least one row to obtain sums in each row, and determine whether the sum in each row is smaller than a predetermined threshold set for each row, where the first and the second windows are located in one frame, the second pixel is located in a second field adjacent to a first field where the first window is located, and a position of the second pixel in the second field corresponds to a position of the pixel to be interpolated in the first field.

9. The apparatus according to claim 8, wherein the determination circuitry further comprises a second determination unit, configured to:
- select a third window by taking the pixel to be interpolated as a center, where the third window comprises at least two rows of pixels having known pixel values, calculate pixel value differences between each pixel in the at least two rows and a corresponding pixel in the previous frame, sum absolute values of the differences for each of the at least two rows to obtain sums in each row, and determine whether the sum in each row is smaller than a predetermined threshold set for each row, where the number of rows included in the third window is equal to the number of rows included in the first window, and the number of columns included in the third window is greater than the number of columns included in the first window; and
- select a fourth window by taking the first pixel as a center, where the fourth window comprises at least one row of pixels having known pixel values, calculate pixel value differences between each pixel in the at least one row and a corresponding pixel in the previous frame, sum absolute values of the differences for each of the at least one row to obtain sums in each row, and determine whether the sum in each row is smaller than a predetermined threshold set for each row.

10. The apparatus according to claim 7, wherein the second processing circuitry comprises:
- a gradient band determination unit, configured to: when the pixel to be interpolated is in the moving mode, determine gradient bands along a plurality of directions by taking the pixel to be interpolated as a center;
- a direction calculation unit, configured to: determine a direction of the pixel to be interpolated based on the gradient bands; and
- an interpolation unit, configured to: set the pixel value of the pixel to be interpolated by interpolation based on the direction.

11. The apparatus according to claim 7, wherein the second processing circuitry is configured to:
- compare normalized first-order differential values of gradient bands on each direction;
- determine a direction having a smallest normalized first-order differential value as a first direction, and a direction having a second smallest normalized first-order differential value as a second direction; and
- if an absolute value of a first difference between the normalized first-order differential value of gradient band on the first direction and the normalized first-order differential value of gradient band on the second direction is greater than a predetermined value, determine the first direction as the direction of the pixel to be interpolated.

12. The apparatus according to claim 11, wherein the second processing circuitry is further configured to:
- if the absolute value of the first difference between the normalized first-order differential value of gradient band on the first direction and the normalized first-order differential value of gradient band on the second direction is smaller than the predetermined value, determine a third direction symmetric with the first direction and a fourth direction symmetric with the second direction;
- determine an absolute value of a second difference between the normalized first-order differential value of gradient band on the first direction and a normalized first-order differential value of gradient band on the third direction, and an absolute value of a third difference between the normalized first-order differential value of gradient band on the second direction and a normalized first-order differential value of gradient band on the fourth direction;
- if the absolute value of the second difference is greater than the absolute value of the third difference, determine the first direction as the direction of the pixel to be interpolated; and
- if the absolute value of the second difference is smaller than or equal to the absolute value of the third difference, determine the second direction as the direction of the pixel to be interpolated.

13. A method for de-interlacing a television signal, comprising:

determining whether a pixel to be interpolated is in a strictly static mode;

if it is determined that the pixel to be interpolated is in the strictly static mode, obtaining a pixel value of a first pixel in a following field which corresponds to the pixel to be interpolated and setting a pixel value of the pixel to be interpolated to be equal to the pixel value of the first pixel in the following field, or, if it is determined that the pixel to be interpolated is in the strictly static mode, obtaining a pixel value of a second pixel in a previous field which corresponds to the pixel to be interpolated and the pixel value of the first pixel in the following field which corresponds to the pixel to be interpolated, and setting the pixel value of the pixel to be interpolated to be equal to an average value of the pixel value of the second pixel and the pixel value of the first pixel; and if it is determined that the pixel to be interpolated is not in the strictly static mode, determining gradient bands along a plurality of directions by taking the pixel to be interpolated as a center, determining a direction of the pixel to be interpolated based on the gradient bands, and setting the pixel value of the pixel to be interpolated by interpolation based on the direction.

14. An apparatus for de-interlacing a television signal, comprising:

a determination circuitry, configured to determine whether a pixel to be interpolated is in a strictly static mode;

a first processing circuitry, configured to: if it is determined that the pixel to be interpolated is in the strictly static mode, obtain a pixel value of a first pixel in a following field which corresponds to the pixel to be interpolated and set a pixel value of the pixel to be interpolated to be equal to the pixel value of the first pixel in the following field, or, obtain a pixel value of a second pixel in a previous field which corresponds to the pixel to be interpolated and the pixel value of the first pixel in the following field which corresponds to the pixel to be interpolated, and set the pixel value of the pixel to be interpolated to be equal to an average value of the pixel value of the second pixel and the pixel value of the first pixel; and a second processing circuitry, configured to: if it is determined that the pixel to be interpolated is not in the strictly static mode, determine gradient bands along a plurality of directions by taking the pixel to be interpolated as a center, determine a direction of the pixel to be interpolated based on the gradient bands, and set the pixel value of the pixel to be interpolated by interpolation based on the direction.

* * * * *